United States Patent
Yamamoto

(10) Patent No.: US 7,773,141 B2
(45) Date of Patent: Aug. 10, 2010

(54) MONITOR CONTROL APPARATUS FOR OPTICAL DEVICE

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 960 days.

(21) Appl. No.: 11/166,165

(22) Filed: Jun. 27, 2005

(65) Prior Publication Data

US 2006/0007238 A1 Jan. 12, 2006

(30) Foreign Application Priority Data

Jul. 1, 2004 (JP) .......................... P2004-195295

(51) Int. Cl.
*H04N 5/222* (2006.01)
(52) U.S. Cl. ............. 348/333.01; 345/102; 348/211.13; 348/222.1
(58) Field of Classification Search ............ 348/333.13, 348/333.01
See application file for complete search history.

(56) References Cited

U.S. PATENT DOCUMENTS

| | | | | |
|---|---|---|---|---|
| 5,063,524 A | * | 11/1991 | Ferre et al. .................. | 382/107 |
| 6,597,339 B1 | * | 7/2003 | Ogawa ........................ | 345/102 |
| 6,621,520 B1 | | 9/2003 | Sawanobori | |
| 7,304,654 B2 | * | 12/2007 | Mori et al. .................. | 345/690 |
| 2004/0246242 A1 | * | 12/2004 | Sasaki ........................ | 345/204 |
| 2006/0085121 A1 | * | 4/2006 | Jeong ......................... | 701/200 |
| 2006/0092164 A1 | * | 5/2006 | Takeuchi et al. ............ | 345/530 |

FOREIGN PATENT DOCUMENTS

| | | | |
|---|---|---|---|
| JP | 8-242398 | | 9/1996 |
| JP | 11039495 A | * | 2/1999 |
| JP | 2003255901 A | * | 9/2003 |

OTHER PUBLICATIONS

English Language Abstract of JP 8-242398.

* cited by examiner

*Primary Examiner*—Jason Chan
*Assistant Examiner*—Cynthia Calderon
(74) *Attorney, Agent, or Firm*—Greenblum & Bernstein P.L.C.

(57) ABSTRACT

A monitor control apparatus is provided in an optical device, such as a digital camera. A brightness control processor controls a brightness of a monitor of the optical device. A detecting processor detects an amount of change of an image sensed by an imaging sensor mounted in the optical device. The brightness control processor has an economy mode, in which the brightness is decreased when the amount of change is greater than a threshold value.

8 Claims, 3 Drawing Sheets

MONITOR CONTROL APPARATUS FOR OPTICAL DEVICE

BACKGROUND OF THE INVENTION

1. Field of the Invention

The present invention relates to an apparatus for controlling a brightness of a monitor provided in an optical device, such as a digital camera.

2. Description of the Related Art

Conventionally, there is known a digital camera, for example, provided with a monitor containing a liquid crystal display, so as to observe a subject to be photographed, or to reproduce and indicate a photographed image. The liquid crystal display is often provided with a backlight using an LED and so on, so as to make an image indicated on the surface easy to observe. However, electric power consumption of the backlight of the liquid crystal display is great, which exhausts the battery of the digital camera very quickly. Thus, it has been proposed in Japanese Unexamined Patent Publication No. 8-242398 that, when a battery of an electronic flash is being charged or a subject image is dark, the backlight is darkened to reduce the electric power consumption.

There is a limit to the capacity of a battery used in a digital camera. Therefore, the reduction of electric power consumption is not sufficient, if the backlight is merely darkened when charging the battery of the electronic flash or when a subject is dark.

SUMMARY OF THE INVENTION

Therefore, an object of the present invention is to further decrease an electric power consumption of the monitor.

According to the present invention, there is provided an apparatus for controlling a monitor provided in an optical device, the control apparatus comprising a brightness control processor and a detecting processor. The brightness control processor controls a brightness of the monitor. The detecting processor detects an amount of change of an image, which is to be indicated on the monitor. The brightness control processor sets an economy mode, in which the brightness is decreased to a level lower than that of a normal mode when the amount of change is greater than a threshold value.

Further, according to the present invention, there is provided a digital camera comprising a brightness control processor and a detecting processor. The brightness control processor controls the brightness of a monitor. The detecting processor detects an amount of change of an image sensed by an imaging sensor. The brightness control processor has an economy mode, in which the brightness is decreased when the amount of change is greater than a threshold value.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
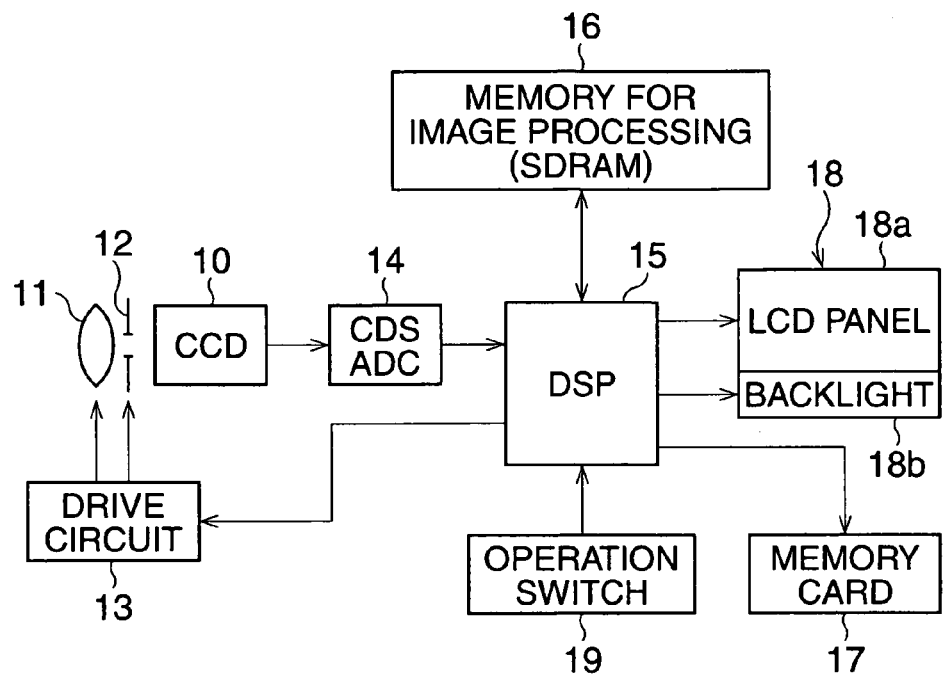
FIG. 1 is a block diagram showing a general construction of a digital camera provided with a monitor control apparatus of a first embodiment of the present invention.

The present invention will be described below with reference to the embodiment shown in the drawings.

FIG. 1 is a block diagram showing a general construction of an optical device or digital camera provided with a monitor control apparatus of a first embodiment of the present invention.

Red (R), green (G), and blue (B) color filters, which are arranged according to the Bayer matrix, are provided on a light-receiving surface of an imaging device (CCD) 10. A photographing lens 11, and a shutter 12 are disposed in front of the light-receiving surface, and are driven by a drive circuit 13. Namely, a focusing operation of the photographing lens 11 and an open-close operation of the shutter 12 are controlled by the drive circuit 13, so that, when the shutter 12 is open, light beam passing through the photographing lens 11 enters the imaging device 10, by which a two-dimensional image obtained through the photographing lens 11 is sensed. Thus, an analogue image signal, corresponding to the image, is generated in the imaging device 10.

The image signal is input to an analogue signal processing circuit 14, provided with a correlated double sampling circuit (CDS) and an analogue-digital converter (ADC), in which a noise component is removed from the image signal, and the image signal is converted to digital pixel data. The pixel data are temporarily stored in a memory for image processing (SDRAM) 16, connected to a control unit 15, in which a digital signal processing circuit (DSP) is installed. The pixel data are then read out from the memory 16, and are subjected to various kinds of image processes in the DSP, and stored in the memory 16 as a processed image data.

The processed image data is read out from the memory 16, so that the processed image data is subjected to an image compression, and recorded in a memory card 17 as a still image. The processed image data of the still image is also transmitted to a monitor or liquid crystal display 18, so that a color image of the still image is indicated thereon. The image signal, read out form the imaging device 10, is directly input to the liquid crystal display 18 through the analogue signal processing circuit 14 and the control unit 15, so that a monitor image or moving image is indicated on the liquid crystal display 18.

An operation switch 19, for performing various kinds of operations such as a recording operation of the processed image data to the memory card 17, is connected to the control unit 15.

The liquid crystal display 18 has an LCD panel 18a and a backlight 18b. The backlight 18b has an LED, and the amount of illumination of the backlight 18b is controlled by the control unit 15, so that a luminance or brightness of a surface of the LCD panel 18a is adjusted.

The amount of illumination of the backlight 18b is adjusted in accordance with the amount of change (i.e., the amount of movement) of an image detected by the imaging device 10, or to be indicated by the liquid crystal display 18, in an economy mode or energy conservation mode, as described later. The image changes when the subject moves, or the camera is moved, which causes the subject not to be fixed. When the amount of change of the image is extremely large, it is deemed that a photographing operation will not be carried out immediately, so that the amount of illumination of the backlight 18b is decreased in comparison with that in a normal mode, in which the liquid crystal display 18 is operated with a usual brightness.

Figure 2:
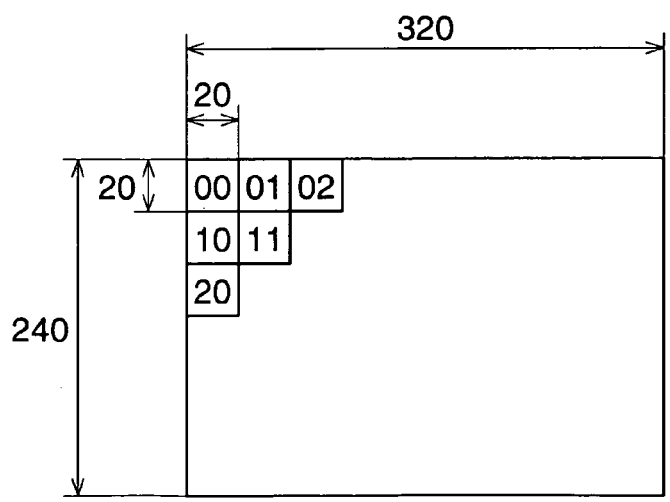
FIG. 2 is a view showing a state, in which an image is divided into blocks so as to calculate the amount of change of the image.

With reference to FIG. 2, a calculation of the amount of change of the image, carried out in the control unit 15, is described below.

The pixel data input from the imaging device 10 are subjected to a white balance adjustment, and are then subjected to an image interpolation, so that red (R), green (G), and blue (B) pixel data are obtained for all of the pixels of the image. Each of the pixel data is subjected to a predetermined process such as a gamma correction, and is then subjected to an RGB-YUV conversion, so that R, G, and B pixel data are converted to luminance data (Y) and color differential data or U-data (=B−Y) and V-data (=R−Y), using a known method.

In the embodiment, an image of one frame is formed by a matrix having 320 pixels in a horizontal direction, and 240 pixels in a vertical direction, and is divided into a (20×20) pixel block. Namely, one image is composed of (16×12) blocks. Regarding all of the blocks, an average value of luminance is calculated, using the luminance data (Y) or G-pixel data. Here, a case, in which the luminance data (Y) is used, is described below. Namely, an average value of luminance in a block of coordinates (m,n) is obtained according to formula (1).

$$BL(m, n) = \frac{1}{400} \sum_{\substack{x=0 \\ y=0}}^{\substack{x=19 \\ y=19}} Y[x, y] \qquad (1)$$

The calculation of the formula (1) is performed for all of the (16×12) blocks, so that (16×12) average luminance values are obtained for one frame image. The amount of change of the image is obtained by calculating the difference in average luminance values for each of the blocks, and comparing the differences with respect to different frames. It is supposed that an average luminance value of each block in a first frame image is $BL_1(m,n)$, and the average luminance value of each block in a second frame image is $BL_2(m,n)$. The amount of change VR of an image is obtained according to the formula (2). Namely, the amount of change VR is the sum of the absolute values of the differences of luminance average values between the corresponding blocks of the first and second frame images.

$$VR = \sum_{\substack{m=0 \\ n=0}}^{\substack{m=15 \\ n=11}} |BL_1(m, n) - BL_2(m, n)| \qquad (2)$$

The time difference between the first and second frame images can be arbitrarily set, and is 5 frame's worth (i.e., 5×1/30 second), for example.

According to formula (1) and (2), the amount of change in the image, or the amount of movement, is obtained periodically (1/6 second, for example). Thus, when the amount of change is greater than a threshold value, it is deemed that a photographing operation will not be performed yet, so that the amount of illumination of the backlight 18b is decreased, to reduce the brightness of the liquid crystal display 18.

Figure 3:
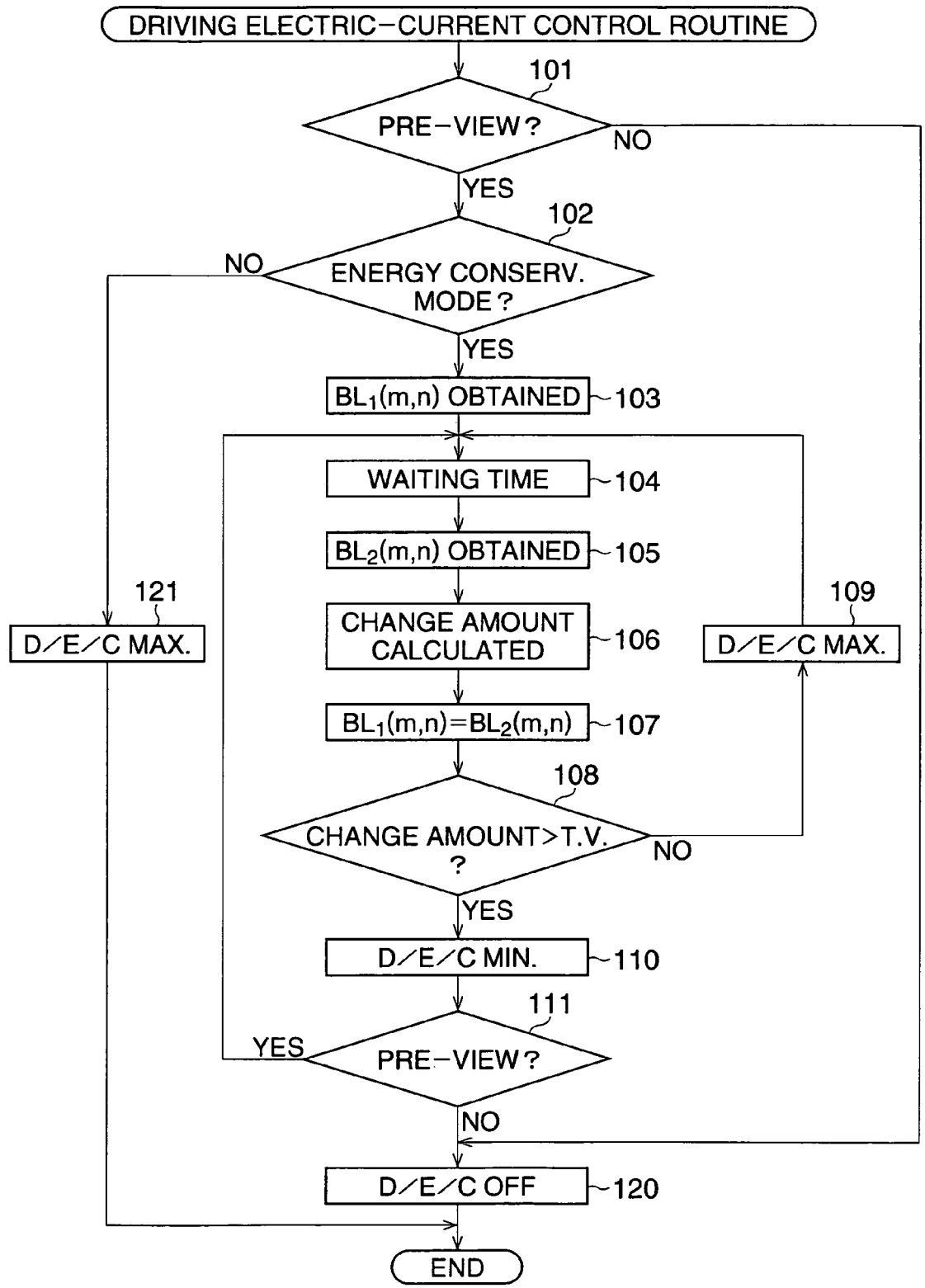
FIG. 3 is a flowchart of a control routine for controlling electric current supplied to an LED.

FIG. 3 is a flowchart of a routine for controlling the driving of the electric-current, which is supplied to the LED or backlight 18b, so as to adjust the illumination amount of the backlight 18b. The control routine is executed at every constant time in the control unit 15, when a main switch or electric power switch of the digital camera is turned ON.

In Step 101, it is determined whether a pre-view is allowed or not, or it is judged whether a subject to be photographed is indicated on the liquid crystal display 18. The pre-view is allowed by, for example, operating a monitor switch mounted in the digital camera. That is, when the monitor switch is turned ON, the pre-view is allowed, so that the processes following Step 102 are performed. Conversely, when the monitor switch is turned OFF, the pre-view is not allowed, so that the process goes to Step 120, in which the supply of the driving electric-current to the LED is stopped, and thus, the LED is turned OFF, and this control routine ends.

In Step 102, it is determined whether an economy mode is set. The economy mode is set by operating an energy conservation switch provided in the digital camera. When the economy mode is not set, Step 121 is executed, in which the driving electric-current is set to a maximum value, so that the illumination amount of the backlight 18b becomes the maximum. Namely, the liquid crystal display 18 is driven in a normal mode, and this control routine ends.

When it is judged in Step 102 that the economy mode is set, Step 103 is executed, in which a first luminance average value $BL_1(m,n)$ is obtained for all the blocks of one image consisting of (16×12) blocks. The image is obtained from the imaging device 10, immediately before the execution of Step 103.

In Step 104, the process waits for a predetermined time period. This time period is 1/6 second, for example, as described above. In Step 105, a second luminance average value $BL_2(m,n)$ is obtained in a similar way as Step 103, based on an image obtained from the imaging device 10 after the waiting time of Step 104.

In Step 106, the amount of change VR is calculated according to the formula (2). In Step 107, the second luminance average value $BL_2(m,n)$ is reset to a first luminance average value $BL_1(m,n)$. Then it is determined in Step 108 whether the amount of change VR is greater than a threshold value.

When it is determined in Step 108 that the amount of change VR is not greater than the threshold value, or when the amount of movement is relatively small, a photographing operation may be immediately carried out. Therefore, in Step 109, the driving electric-current is set to the maximum value, so that the illumination amount of the backlight 18b is set to the maximum value. Namely, when the amount of change VR is not greater than the threshold value, the brightness of the liquid crystal display 18 is set to a high level, or the brightness is controlled not to be decreased, regardless of the economy mode. After the execution of Step 109, the process goes back to Step 104, so that Steps 104 through 108 are again executed.

Conversely, when it is determined in Step 108 that the amount of change VR is greater than the threshold value, the process goes to Step 110, in which the driving electric-current is set to a minimum value. Thus, when the amount of change VR is great, for example, in a case, where the photographer is not holding the camera while aiming at a subject, while setting to a photographing mode, where the photographer is changing the angle of view to take the next photograph, it is usual that the pre-view image is not observed. Thus, the illumination amount of the backlight 18b is adjusted to the minimum value, so that the brightness of the liquid crystal display 18 is set to a low value.

In Step 111, it is determined whether a pre-view is allowed or not, similarly to Step 101. When the pre-view is not allowed, Step 120 is executed, and this control routine ends, and when the pre-view is allowed, the process goes back to Step 104, to carry out the operations described above, which are performed again.

Figure 4:
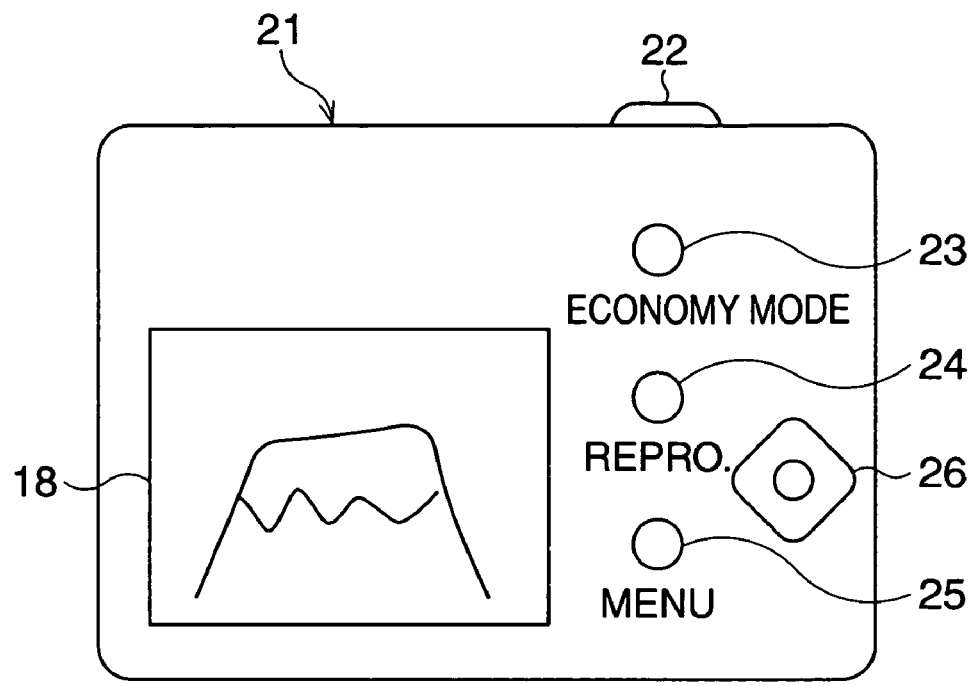
FIG. 4 is a view showing the digital camera when viewing from a back of the digital camera.

FIG. 4 is a view showing the digital camera 21 when viewed from a back of the digital camera 21, in which a release button 22 is provided on an upper surface. The liquid crystal display 18 is arranged on a left side of the rear surface thereof, and an economy mode switch 23, a reproduction switch 24, a menu switch 25, and a cross key 26 are disposed on the right side of the rear surface.

Figure 5:
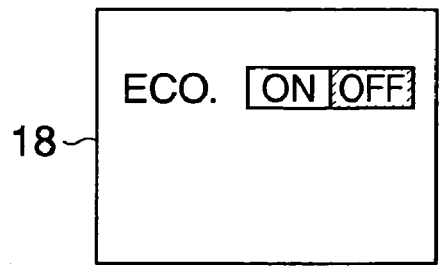
FIG. 5 is a view showing an image, indicated on the monitor, for setting an economy mode.

By pressing the economy mode switch 23, an image shown in FIG. 5 is indicated. One of "ON" and "OFF" buttons indicated in the image is selected by operating the cross key 26, so that the economy mode is set. Namely, the economy mode is set when "ON" is selected, and the normal mode is set when "OFF" is selected.

The reproduction switch 24 is operated to indicate a still image, recorded in the memory card 17, on the liquid crystal display 18. The menu switch 25 is operated to set various kinds of conditions. For example, by operating the menu switch 25 and the cross key 26, a photographing mode is set, so that a photographing operation is performed by pressing the release button 22. When the photographing mode is set, if it is necessary to carry out a pre-view using the liquid crystal display 18, the economy mode can be set by operating the economy mode switch 23 and the cross key 26. When the reproduction switch 24 or the menu switch 25 is operated so that the photographing mode is not set, the economy mode is not set since it is necessary to set the brightness of an image indicated on the liquid crystal display 18 to a high level.

As described above, in the embodiment, the economy mode can be set when the photographing mode, in which an image can be observed through the liquid crystal display 18, is set, and the economy mode is not set when the photographing mode is not set. Thus, in the photographing mode, when a subject to be photographed moves, and the amount of change of the image is greater than the threshold value, the brightness of the liquid crystal display 18 is decreased to a level lower than that of a normal mode. Accordingly, the electric power consumed by the digital camera is reduced, so that the life of the battery can be extended.

Note that, although the present invention is applied to a digital camera in the embodiment, the present invention can be applied to a cellular phone provided with a photographing function.

Further, in the embodiment, the amount of change of an image is an average value of the luminance values of a (20× 20) pixel block. However, the amount of change can be a luminance value of one pixel representing one block.

When the digital camera has a zooming function, the threshold value of Step 108 can be changed in accordance with the focal distance of the photographing lens; for example, it can be increased if the photographing lens is set to a telescope side.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-195295 (filed on Jul. 1, 2004) which is expressly incorporated herein, by reference, in its entirety.

The invention claimed is:

1. A control apparatus for controlling a monitor provided in an optical device, said control apparatus comprising:

a brightness control processor that controls a brightness of said monitor; and a detecting processor that detects an amount of change in movement of an object produced as an image and indicated on said monitor;

said brightness control processor setting an economy mode, in which said brightness is decreased to a level lower than that of a normal mode when the amount of change in movement of said object produced as said image on said monitor is greater than a threshold value; and said detecting processor comprising:

an average value calculating processor that divides said image into a plurality of blocks, and calculates an average value of luminance values for each of said blocks according to a formula:

$$BL(m, n) = \frac{1}{a*b} \sum_{\substack{x=0 \\ y=0}}^{\substack{x=a-1 \\ y=b-1}} Y[x, y], \text{ wherein}$$

m corresponds to a coordinate along a first coordinate axis in the image, n corresponds to a coordinate along a second coordinate axis in the image, a corresponds to a number of pixels along said first coordinate axis in a block of pixels, and b corresponds to a number of pixels along said second coordinate axis in said block of pixels; and a change amount calculating processor that controls said average value calculating processor so that said average values are obtained for different images, to calculate the amount of change in movement of said object produced as said image on said monitor according to a formula:

$$VR = \sum_{\substack{m=0 \\ n=0}}^{\substack{m=c-1 \\ n=d-1}} |BL_1(m, n) - BL_2(m, n)|, \text{ wherein}$$

m corresponds to a coordinate along a first coordinate axis in the image, n corresponds to a coordinate along a second coordinate axis in the image, c corresponds to a number of blocks along said first coordinate axis in the image, and d corresponds to a number of blocks along said second coordinate axis in the image.

2. A control apparatus according to claim 1, wherein said image is sensed by an imaging device provided in said optical device.

3. A control apparatus according to claim 1, wherein said brightness control processor controls said brightness not to be decreased regardless of said economy mode, when the amount of change in movement of said object produced as said image on said monitor is less than said threshold value.

4. A control apparatus according to claim 1, wherein said monitor comprises a liquid crystal display.

5. A control apparatus according to claim 4, wherein said brightness control processor adjusts an illumination amount of the backlight of said liquid crystal display.

6. A control apparatus according to claim 1, wherein said brightness control processor sets said economy mode when said optical device is set to a photographing mode, in which said image can be observed through said monitor, and does not set said economy mode when said photographing mode is not set.

7. A control apparatus according to claim 1, further comprising a switching processor that determines whether said economy mode can be set or not.

8. A digital camera comprising:
- a brightness control processor that controls a brightness of a monitor; and
- a detecting processor that detects an amount of change in movement of an object produced as an image sensed by an imaging sensor;
- said brightness control processor having an economy mode, in which said brightness is decreased when the amount of change in movement of said object produced as said image is greater than a threshold value; and
- said detecting processor comprising:
  - an average value calculating processor that divides said image into a plurality of blocks, and calculates an average value of luminance values for each of said blocks according to a formula:

$$BL(m, n) = \frac{1}{a*b} \sum_{\substack{x=0 \\ y=0}}^{\substack{x=a-1 \\ y=b-1}} Y[x, y], \quad \text{wherein}$$

m corresponds to a coordinate along a first coordinate axis in the image, n corresponds to a coordinate along a second coordinate axis in the image, a corresponds to a number of pixels along said first coordinate axis in a block of pixels, and b corresponds to a number of pixels along said second coordinate axis in said block of pixels; and a change amount calculating processor that controls said average value calculating processor so that said average values are obtained for different images, to calculate the amount of change in movement of said object produced as said image on said monitor according to a formula:

$$VR = \sum_{\substack{m=0 \\ n=0}}^{\substack{m=c-1 \\ n=d-1}} |BL_1(m, n) - BL_2(m, n)|, \quad \text{wherein}$$

m corresponds to a coordinate along a first coordinate axis in the image, n corresponds to a coordinate along a second coordinate axis in the image, c corresponds to a number of blocks along said first coordinate axis in the image, and d corresponds to a number of blocks along said second coordinate axis in the image.

* * * * *